United States Patent
Ruman et al.

[11] Patent Number: 5,913,302
[45] Date of Patent: Jun. 22, 1999

[54] IGNITION COIL DWELL TIME CONTROL SYSTEM

[75] Inventors: Mark A. Ruman, Fond du Lac; Douglas R. Potratz, Oshkosh, both of Wis.

[73] Assignee: Brunswick Corporation, Lake Forest, Ill.

[21] Appl. No.: 08/934,475

[22] Filed: Sep. 19, 1997

[51] Int. Cl.[6] .................................................. F02P 9/00
[52] U.S. Cl. ............................................................ 123/609
[58] Field of Search ............................................ 123/609

[56] References Cited

U.S. PATENT DOCUMENTS

| | | | |
|---|---|---|---|
| 4,351,306 | 9/1982 | Luckman et al. | 123/609 |
| 4,487,183 | 12/1984 | Petrie | 123/609 |
| 4,489,689 | 12/1984 | Avian et al. | 123/609 |
| 4,638,785 | 1/1987 | Matsui et al. | 123/609 |
| 4,649,888 | 3/1987 | Kawai et al. | 123/609 |
| 5,043,900 | 8/1991 | Allen et al. | 123/609 |
| 5,546,905 | 8/1996 | Fukui | 123/609 |
| 5,553,594 | 9/1996 | Ehlers et al. | 123/609 |

OTHER PUBLICATIONS

Battery ignition, pp. 100–103 and 122–127.
Spark Plug Fouling: A Quick Engine Test, Ather A. Quader et al., SAE Paper 920006, Feb. 2–6, 1992.

*Primary Examiner*—John Kwon
*Attorney, Agent, or Firm*—Andrus, Sceales, Starke & Sawall

[57] ABSTRACT

A two-stroke direct fuel injected internal combustion engine has an ignition coil dwell time control system. An electronic control unit controls switching of electronic ignition coil drivers in a manner to minimize ignition coil dwell times at medium and high engine speeds where low ignition coil dwell times can be used without sacrificing engine performance. The electronic control unit also implements an intermittent spark plug cleaning strategy to remove carbon deposits from fouled spark plugs. Intermittent cleaning is accomplished during engine operation by periodically raising the ignition coil dwell time to an exaggerated cleaning level for a relatively short period of time (e.g. one minute) after it is determined the spark plug cleaning should occur (e.g. 10 to 20 engine operating hours since previous cleaning).

10 Claims, 6 Drawing Sheets

IGNITION COIL DWELL TIME CONTROL SYSTEM

FIELD OF THE INVENTION

The invention relates to spark ignition systems for internal combustion engines. In particular, the invention relates to an ignition coil dwell time control system that minimizes spark plug fouling and electrode wear while maintaining optimum engine performance. The invention is especially useful in direct fuel injected engines for marine propulsion systems.

BACKGROUND OF THE INVENTION

Currently available direct fuel injected two-stroke engines typically use battery-powered inductive spark ignition systems in which spark advance timing is electronically controlled. In such a system, the electronic control module contains an electronic driver for each spark plug which controls operation of the ignition coil providing spark voltage to the respective spark plug. The ignition coil includes a primary winding and a secondary winding. One end of the primary winding is connected to the battery (e.g. 12 volts DC) and the other end of the primary winding is connected to the electronic driver (i.e. a switching mechanism) which is connected to ground. When the electronic control unit instructs the driver to close, electrical current flows through the primary winding and establishes a magnetic field in the ignition coil. To fire the spark plug at a desired time, the electronic control unit instructs the driver to open, thus collapsing the magnetic field inside the ignition coil to induce high tension voltage in the ignition coil secondary winding. The secondary winding is connected to the spark plug, and the high tension voltage creates a spark across the spark plug electrodes to ignite the fuel/air mixture in the combustion chamber. Spark advance timing is typically determined using a look-up table in the electronic control unit based on engine rpm and engine load (e.g. throttle position, manifold air pressure, etc.).

The period of time that the primary winding of the ignition coil charges is referred to as the ignition coil dwell time. Generally speaking, spark energy and spark duration increase with higher ignition coil dwell times. Therefore, higher ignition coil dwell times can be used to reduce cylinder misfires. However, higher ignition coil dwell times can cause premature wear to spark plugs and reduce the life of electronic components.

Two-stroke engines having direct fuel injection tend to have higher ignition energy requirements than conventional two-stroke engines. In a direct fuel injected engine, a stratified charge of fuel is delivered through the combustion head via a fuel injector into the combustion cylinder. The spray is aimed at the spark plug electrodes. At idle and low engine loads and speeds, spark ignition is nearly concurrent with fuel injection. However, even though the fuel spray is aimed at the spark electrodes, the local air/fuel ratio in the vicinity of the spark electrode varies greatly. Therefore, it is important to extend spark duration at idle and light loads to ensure ignition and prevent misfire. Extending spark duration can be accomplished by increasing the ignition coil dwell time.

As engine speed and load increases in direct fuel injected engines, it is necessary to inject more fuel into the cylinder, and it is also necessary to begin injection earlier in time than the occurrence of the spark. At high engine speeds (i.e. near or at the rated engine rpm), strong fluid dynamics within the cylinder fully mix the fuel and air before ignition to create a homogeneous and near stoichiometric air/fuel mixture within the combustion chamber. Under these conditions, ignition occurs easily. However, a combustion process transition region exists between the stratified charge at idle and light loads and the stoichiometric homogeneous charge at high loads and speeds. In the transition region, engine speed is sufficiently high to generate strong in-cylinder fluid dynamics which mix excess air with the injected fuel, thereby diluting the stratified charge. In this combustion region, it is again important that the spark have sufficient energy and duration to ignite overly mixed or lean mixtures. Additionally, in marine applications, fluid dynamics within the cylinder can be unpredictable due to fluctuations in exhaust back-pressure because the engine exhaust is typically routed into the water through the propeller hub. At high speeds (e.g. boat on plane), water motion draws the exhaust through the propeller hub and facilitates effective preparation of the air/fuel charge in the cylinder. However, at the onset of planing, the water can be extremely turbulent in the vicinity of the propeller and can induce a fluctuating exhaust back-pressure which can negatively affect the preparation of the air/fuel mixture within the cylinder. In this situation, it is important to have sufficient spark energy to ignite the mixture.

In order to accommodate ignition energy requirements for direct fuel injected engines at idle, off-idle and in the transition region, current systems maintain ignition coil dwell times at a level sufficient to ensure proper ignition at idle, off-idle and in the transition region. However, as previously mentioned, high spark energy and duration prematurely wears spark plug electrodes, which in turn requires frequent replacement of spark plugs in direct fuel injected engines. High spark energy and duration can also cause electronic component overheating which in turn may reduce the life of the electronic control module.

Another problem with spark plugs in direct fuel injected engines is spark plug fouling. Spark plug fouling occurs primarily at relatively low engine operating temperatures. When spark plug fouling occurs, carbon deposits build up on the spark plug insulator, and the carbon itself becomes a destructive path for the spark so that the spark does not jump the gap between the spark plug electrodes. Spark plug fouling is particularly a problem in direct fuel injected engines because fuel is sprayed directly on the spark plugs.

SUMMARY OF THE INVENTION

The invention is an ignition coil dwell time control system that adjusts ignition coil dwell times in accordance with engine operating characteristics to lessen the above-discussed problems with spark plug performance especially prevalent in two-stroke marine engines having direct fuel injection systems. The ignition coil dwell time control is preferably implemented in the engine electronic control unit that also controls operation of the electronic drivers for the ignition coils in a distributorless semiconductor ignition system.

In one aspect of the invention, spark plug dwell times are controlled to intermittently clean spark plug residue during engine operation, thus alleviating spark plug fouling problems. Under normal operating conditions, the ignition coils for the respective cylinders are charged for normal operating dwell times so that spark energy and duration across the spark plug electrodes is at normal operating levels for long-term durability. Intermittently, for instance after 10 to 20 hours of engine operation, spark plug residue is cleaned while the engine is operating. This is accomplished by increasing ignition coil dwell times above normal operating dwell times for a relatively short period of time, for instance one minute. During the relatively short period of time that the ignition coil dwell time is exaggerated, spark energy and duration are sufficient to oxidize spark plug carbon residue which could lead to partial or complete spark plug fouling if left unchecked. Since the exaggerated ignition coil dwell time is applied for only a relatively short period of time, additional spark plug electrode wear and damage to electronic components due to overheating is non-existent or negligible. On the other hand, most spark plug fouling problems are alleviated and the need to replace fouled spark plugs is be reduced.

The determination in the electronic control unit of whether spark plug cleaning is desirable can be based on a history of engine operating conditions since the previous cleaning, or on engine operating hours since the previous cleaning, or both. In addition, it may be desirable to monitor for cylinder misfire and trigger spark plug cleaning upon detection of a misfire.

In another aspect of the invention, the electronic control unit controls normal operating ignition coil dwell times based on engine rpm. Based on engine rpm, ignition coil dwell times are preferably chosen to minimize the value of ignition coil dwell times yet ensure reliable ignition at various engine speeds. Normal operating ignition coil dwell times are preferably determined solely as a function of engine rpm, but in accordance with the invention can be determined on the basis of engine rpm and additional input such as engine load.

At idle, light loads, and in the transition region, the ignition coil is charged for a pre-selected maximum dwell time. The pre-selected maximum dwell time is selected to ensure ignition at these speeds and also so that electronic components such as the electronic ignition coil drivers, etc. are not overburdened during long-term operation. When the engine speed and load increases beyond the combustion transition region, the ignition coil is charged for a dwell time less than the maximum dwell time. The value of the dwell time continuously decreases from the value of the pre-selected maximum dwell time as the engine speed increases beyond the combustion transition region until the value of the dwell time equals the value of a pre-selected minimum dwell time. The pre-selected minimum dwell time corresponds to the optimum dwell time for the ignition coils when the engine is operating at rated rpm and full load.

This aspect of the invention reduces premature spark plug electrode wear by minimizing spark energy and duration at medium to high engine speeds where lower dwell times are possible without affecting engine performance. However, at engine speeds and loads where ignition is difficult in direct fuel injected engines, sufficient spark energy and duration are provided to ensure proper ignition of fuel in the cylinders.

Various other features and advantages of the invention may be apparent to those skilled in the art upon inspecting the following drawings and detailed description thereof.

DETAILED DESCRIPTION OF THE DRAWINGS

Figure 1:
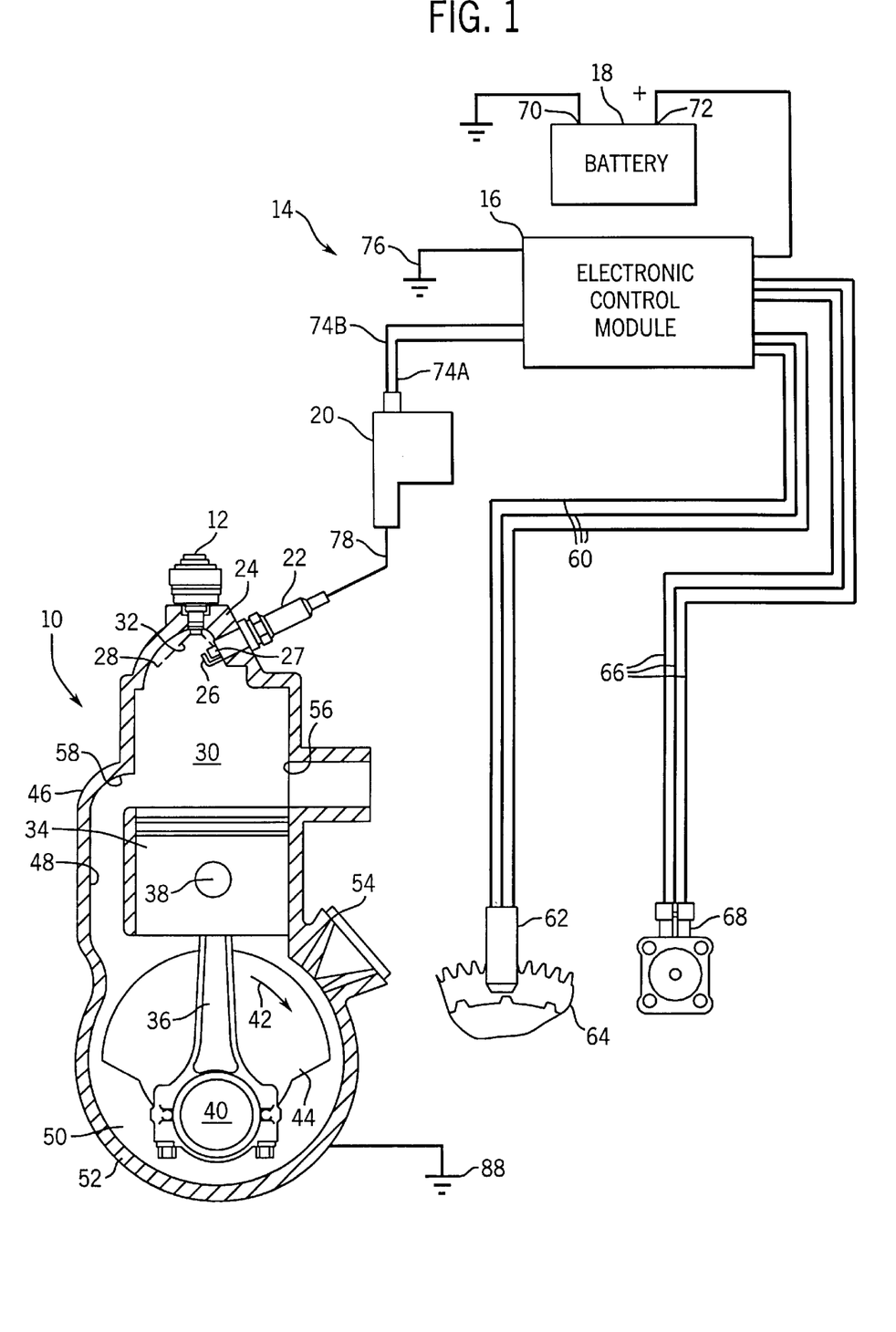
FIG. 1 is a schematic drawing of a two-stroke engine having direct fuel injection and a distributorless electronic ignition system.

FIG. 1 shows one cylinder 10 of a two-stroke engine having a direct fuel injection system 12 and a distributorless electronic ignition system 14. The electronic ignition system 14 includes an electronic control module 16, a battery 18, and an ignition coil 20 and spark plug 22 for each cylinder 10. The spark plug 22 is mounted through the cylinder head 24 so that spark plug electrodes 26 and 27 are exposed in the combustion chamber 28. The combustion chamber 28 is coextensive and above the piston cavity 30 for the cylinder 10. The fuel injection mechanism 12 is mounted through the cylinder head 24 and injects a spray 32 of fuel into the combustion chamber 28. At least a portion of the spray 32 of fuel impinges on the spark plug electrodes 26, 27. The preferred fuel injection mechanism 12 is an air-assisted fuel injector using compressed air to facilitate reliable injection of fuel into the combustion chamber 28.

As is known in the art, a piston 34 reciprocates longitudinally from bottom dead center to top dead center in the piston cavity 30. The piston 34 is connected to a piston rod 36 via connecting pin 38. The piston rod 36 is connected to the engine crankshaft 40 and rotates the crankshaft in a clockwise direction as indicated by arrow 42 on counterweight 44. The cylinder block 46 includes a transfer passage 48 which extends from a charging volume 50 within the crankcase 52 to the portion of the piston cavity 30 communicating with the combustion chamber 28. When the piston 34 is moving upward from bottom dead center to top dead center, fresh air is drawn into the charging volume 50 within the crankcase 52 through reed valve 54. Combustion of fuel injected into the combustion chamber 28 pushes the piston 34 downward from top dead center. As the piston 34 moves downward, the piston skirt initially covers the exhaust port 56 and transfer port 58. As the piston continues to move downward, the crown of the piston 34 first begins to uncover the exhaust port 56 and then begins to uncover the transfer port 58. The downward motion of the piston 34 forces a charge of fresh air in the charging chamber 50 in the crankcase 52 through the transfer passage 48 and the transfer port 58 into the part of the piston cavity 30 communicating with the combustion chamber 28. The fresh air scavenges the byproducts of combustion through the exhaust port 56. The effectiveness of the scavenging process depends in large part on exhaust tuning and the amount of exhaust back-pressure at the exhaust port 56. As the piston 34 moves upward from bottom dead center to top dead center, the piston covers the transfer port 58 and then covers the exhaust port 56. Thereafter, fuel is injected by the fuel injection mechanism 12 into the combustion chamber 28. Since fuel is normally injected into the combustion chamber 28 after the piston 34 completely covers the exhaust port 56 at light loads and low speeds, there is little chance of short-circuiting unburned hydrocarbons through the exhaust port 56 during the scavenging process as often occurs with carbureted engines. On the other hand, pressures within the piston cavity 30 and the combustion chamber 28 at the time of fuel injection are relatively high, and therefore a reliable means of fuel injection such as air-assisted fuel injection is required. The fuel injection mechanism 12 provides a stratified charge of fuel into the combustion chamber 28 when the engine is at idle and at light loads. At idle and light loads, spark timing is virtually concurrent with fuel injection so the fuel charge is highly stratified at the time of ignition. In other words, the spray 32 of fuel injected into the combustion chamber 28 is fuel rich, and the remaining volume within the combustion chamber 28 and adjacent areas of the piston cavity 30 do not contain any appreciable amount of fuel. The localized air/fuel ratio in the vicinity of the spark plug electrodes 26, 27 varies substantially within the fuel spray 32 from completely air to completely liquid fuel. Therefore, at idle and light loads it is important that spark energy and duration be substantial to repeatedly ensure reliable ignition. As engine speed and load increases, it is necessary to inject more fuel into the combustion chamber 28. Because more fuel is injected into the combustion chamber 28, the beginning of fuel injection occurs increasingly earlier before the occurrence of the igniting spark. It is also necessary to open the engine throttle and provide more air to the engine. Although the amount of air supplied per combustion cycle to the combustion chamber 28 does not change substantially with an increase in engine speed, at low engine speeds under boat load conditions, scavenging air flow velocities into and out of the combustion chamber 28 do increase substantially. Due to these factors, the fuel charge within the combustion chamber 28 mixes more thoroughly with excess air in the combustion chamber 28 with increasing engine speed. As engine speed increases to medium and high engine speeds under boat load conditions, the air/fuel mixture in the combustion chamber 28 mixes more thoroughly and becomes virtually homogeneous. At high engine speeds (e.g. near or above the rated engine rpm), the homogeneous air/fuel mixture in the combustion chamber 28 is not only well mixed, but is also near or rich of stoichiometric. Under these conditions, fuel ignition is relatively easy, and spark energy and duration can be relatively small without compromising ignition performance. However, at medium speeds, significant air/fuel mixing occurs and the mixture is often lean of stoichiometric. Under these conditions, the spark energy and/or duration needs to be relatively greater to ensure proper ignition of the mixture.

In accordance with the invention, spark advance timing and ignition coil dwell time are controlled by the electronic control module 16. The electronic control module 16 inputs an engine speed signal and crankshaft position signal in line 60 from a crankshaft position sensor encoder 62 that monitors the position of the crank shown schematically by reference numeral 64. The electronic control module 16 also inputs an engine load signal in line 66 from an engine load sensor 68, such as a throttle position sensor shown schematically in FIG. 1, or alternatively in manifold air pressure sensor, etc. The electronic control module 16 contains a spark advance look-up table or map which determines spark advance timing with respect to engine speed and engine load. The electronic control module 16 also determines the preferred ignition coil dwell time as discussed later with respect to FIGS. 8–10. The electronic control module 16 includes a conventional microprocessor 16A as well as a separate ignition coil driver switch for each ignition coil 20.

The battery 18 has a grounded negative terminal 70 and a positive terminal 72 that provides the ignition system operating voltage to the electronic control module 16. The electronic control module 16 transmits the operating voltage through lines 74A, 74B to charge the ignition coil 20 in accordance with the control scheme. At the appropriate time, the respective ignition coil driver within the electronic control module 16 opens the electrical connection to ground 76, and the electromagnetic field in the ignition coil 20 collapses, thereby providing a high-tension voltage from the ignition coil 20 through line 78 to the spark plug 22.

Figure 2:
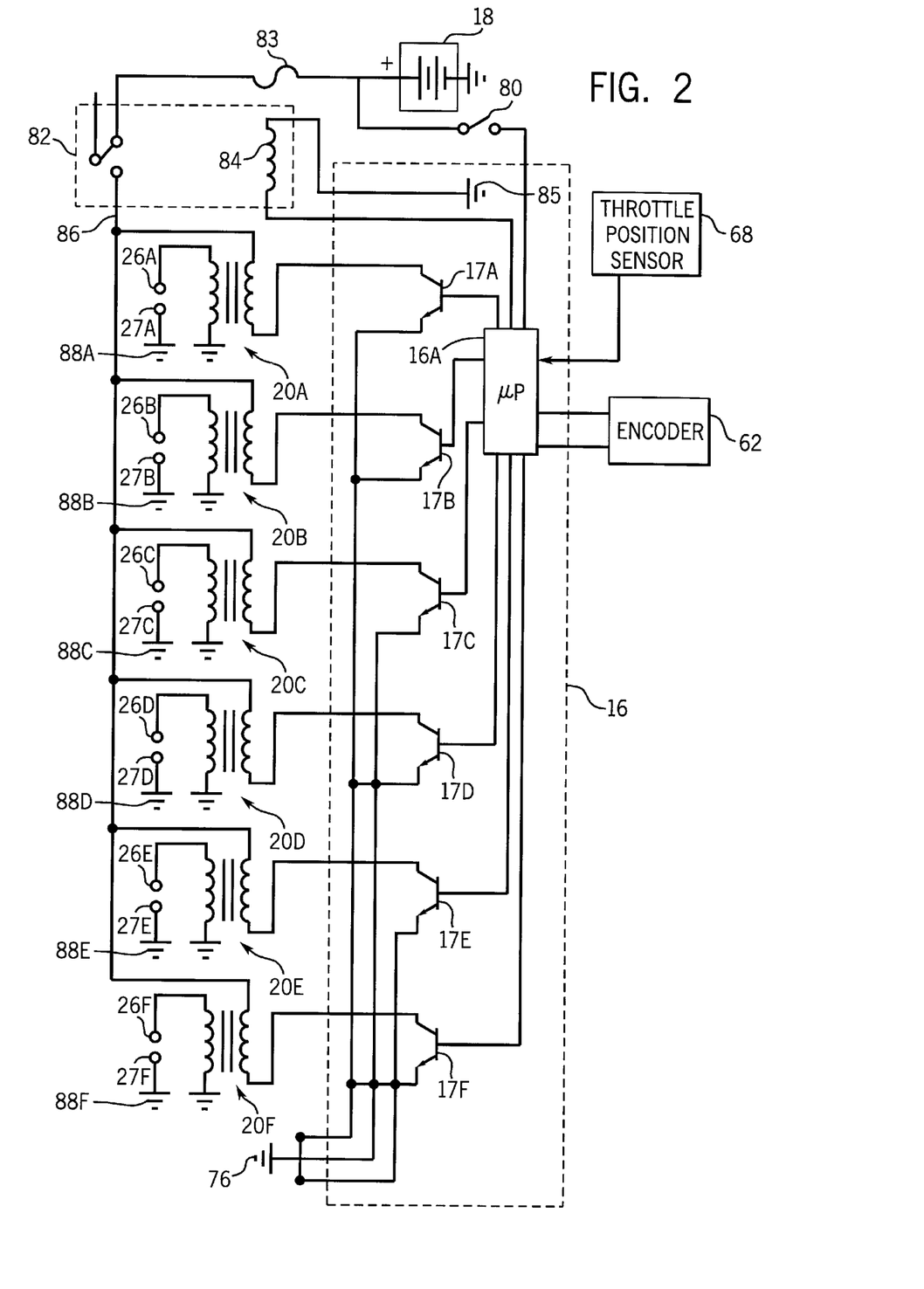
FIG. 2 is a schematic drawing of a distributorless electronic ignition system.

Referring now to FIG. 2, the details of the distributorless semiconductor ignition system are now described. The electronic control module 16 includes a microprocessor 16A and a separate ignition driver 17A, 17B, 17C, 17D, 17E and 17F for each ignition coil 20A, 20B, 20C, 20D, 20E and 20F. The electronic control module 16 receives power from the battery 18 when the ignition key 80 is turned to the ON position. The electronic control module 16 then activates a main power relay 82 by flowing current through solenoid coil 84 to ground 85. The activated main power relay 82 then supplies DC power from the battery 18 through line 86 and fuse 83 to the positive side of the ignition coils 20A, 20B, 20C, 20D, 20E and 20F. As the engine rotates, the crankshaft position sensor 62 provides crankshaft rpm information and crankshaft angle information to the microprocessor 16A. The throttle position sensor 68 provides engine load information to the microprocessor 16A. With this information, the microprocessor 16A determines the appropriate time to trigger each ignition driver 17A, 17B, 17C, 17D, 17E and 17F to remove ground from the negative side of the respective ignition coil 20A, 20B, 20C, 20D, 20E or 20F. With the ground path removed, the magnetic field in the respective coil primary winding collapses and induces a voltage in the secondary circuit for the respective coil 20A, 20B, 20C, 20D, 20E or 20F. The voltage in the secondary circuit for the respective coil 20A, 20B, 20C, 20D, 20E and 20F should provide a sufficient potential difference to jump the gap between respective spark plug electrodes 26A and 27A, 26B and 27B, 26C and 27C, 26D and 27D, 26E and 27E, and 26F and 27F.

Figure 3A:
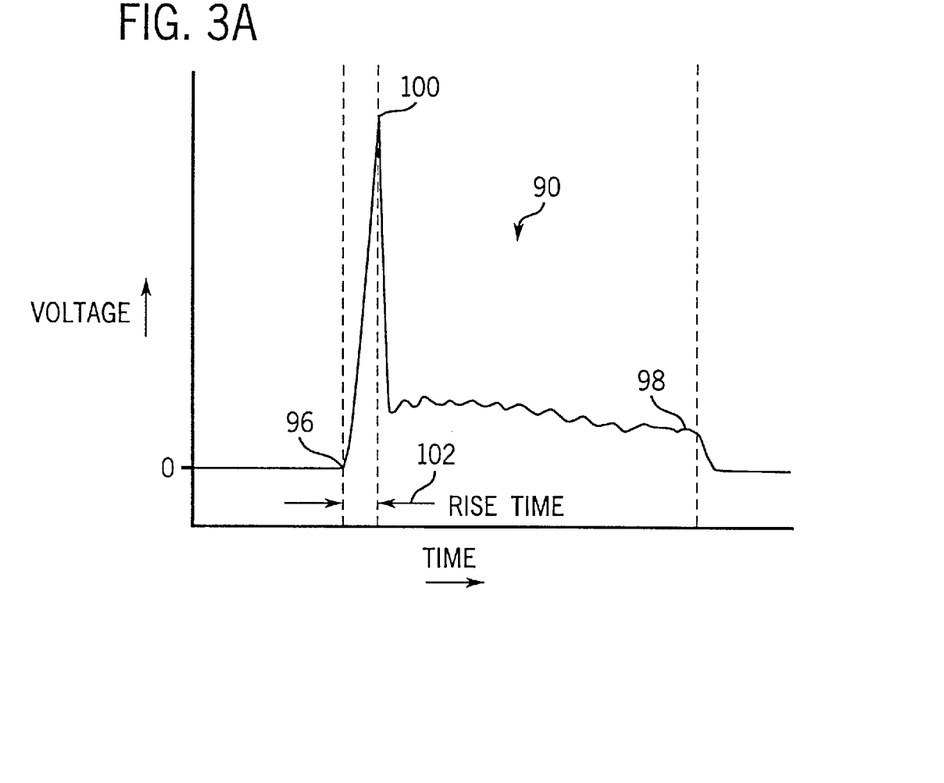
FIG. 3A is a graph illustrating a voltage waveform for an inductive ignition system spark discharge.
Figure 3B:
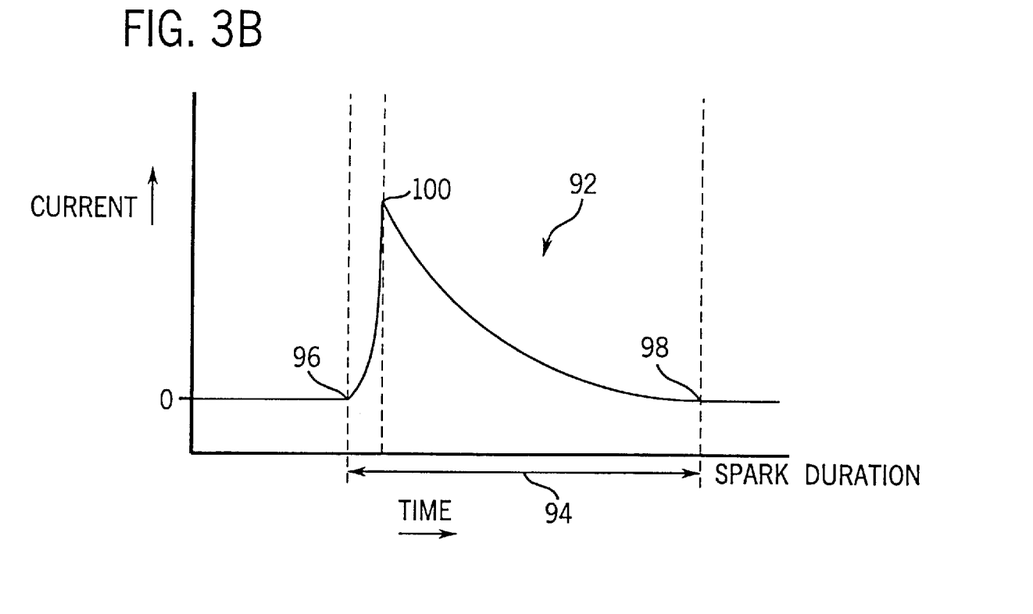
FIG. 3B is a graph illustrating a current waveform for an inductive ignition system spark discharge.
Figure 4:
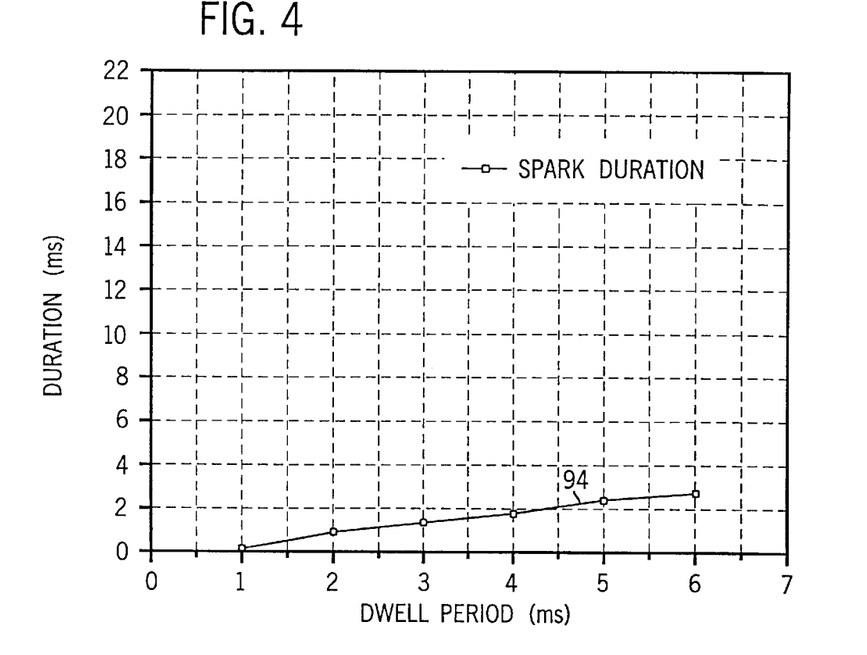
FIG. 4 is a graph illustrating spark duration characteristics in a typical inductive ignition system.
Figure 7:
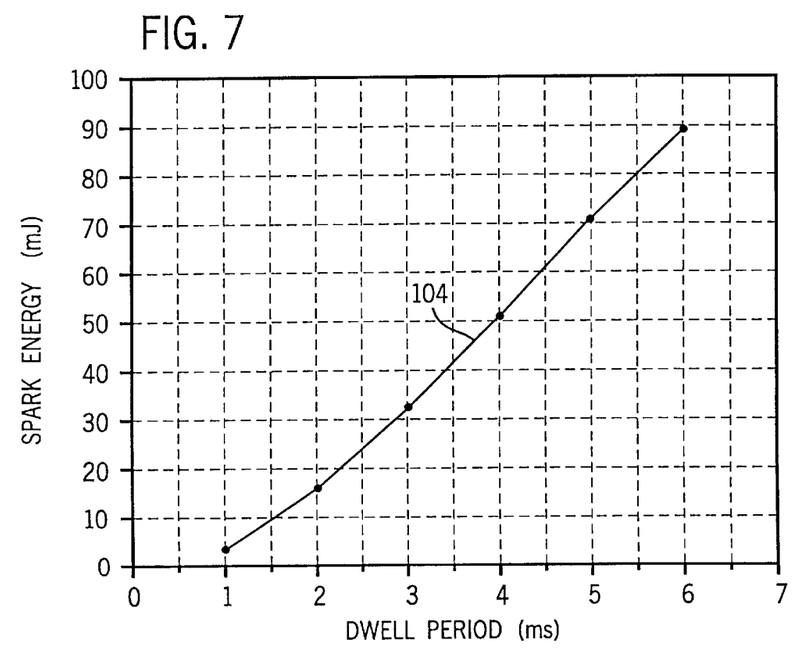
FIG. 7 is a graph illustrating ignition coil spark energy as a function of ignition coil dwell time.

FIGS. 3A and 3B illustrate the profile of spark energy available for ignition when a spark plug 22 fires. The total spark energy for a given spark is determined by the product of the voltage waveform 90 shown in FIG. 3A multiplied by the current waveform 92 shown in 3B which are both supplied from the ignition coil 20 to the spark plug 22. Spark duration is depicted by arrow 94 and last from the beginning of current and voltage increase at point 96 until current and voltage return to 0 at point 98. The time for current and voltage to rise from 0 at point 96 to the maximum level at point 100 is referred to as spark rise time which is depicted by arrow 102. FIG. 4 illustrates the relationship between ignition coil 20 dwell time and spark duration 94. FIG. 7 shows a curve 104 illustrating the relationship between ignition coil 20 dwell time and spark energy. Note that both spark energy and spark duration increase as ignition coil dwell time increases.

Figure 5:
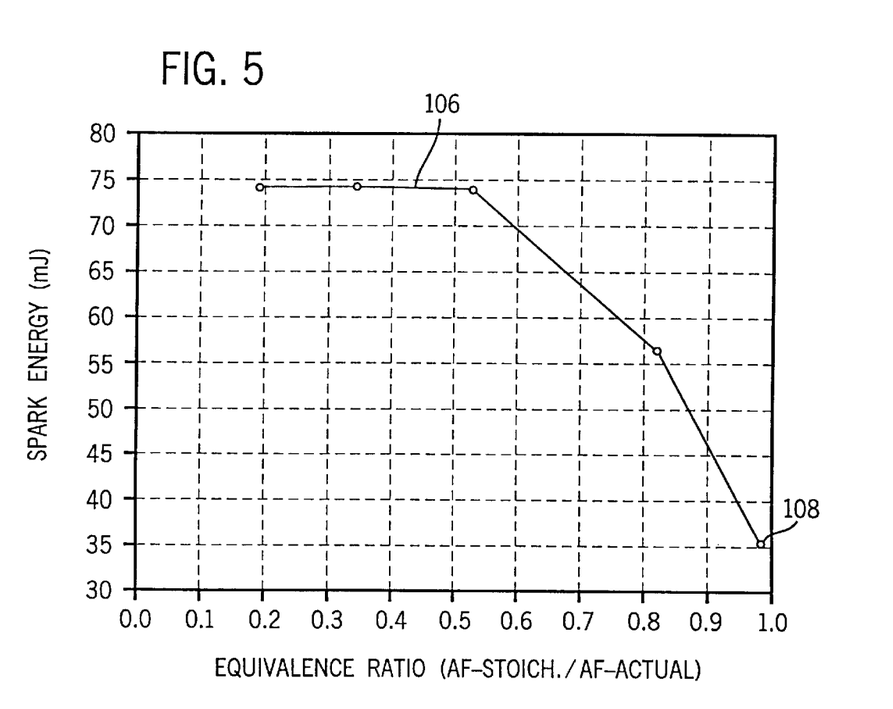
FIG. 5 is a graph illustrating the spark energy requirement for a typical air-assisted direct fuel injected engine in a marine propulsion system

FIG. 5 is a graph showing a curve 106 that illustrates the relationship between the air/fuel ratio of a homogeneous mixture and the required spark energy to ensure reliable ignition. At or near stoichiometric mixtures depicted by point 108 on curve 106, relatively low amounts of spark energy are required for reliable ignition. However, as the mixture becomes more lean (i.e. a greater proportion of excess air), the mixture becomes more difficult to ignite reliably and higher spark energies are required for reliable ignition.

Figure 8:
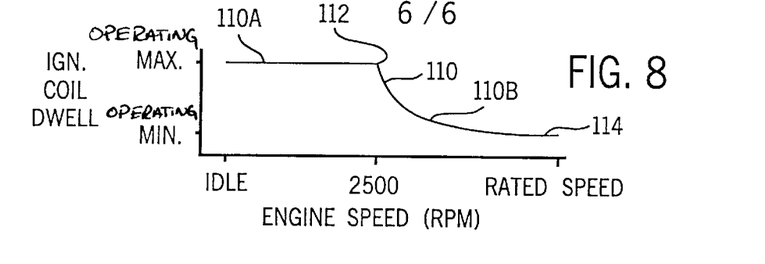
FIG. 8 is a graph illustrating the preferred value of ignition coil dwell time as controlled by an electronic control module in accordance with the invention to minimize spark plug electrode wear without compromising engine performance.

Referring now to FIG. 8, the electronic control module 16 controls ignition coil dwell time as a function of engine speed. The curve 110 in FIG. 8 is an example of ignition coil dwell time control in accordance with the invention. In FIG. 8, a transition engine speed, point 112, is given to be approximately 2500 rpm. At engine speeds below the transition engine speed 112, the ignition coil dwell time is set at a pre-selected maximum dwell time 110A, for instance 5.25 milliseconds. The pre-selected maximum dwell time 110A is selected to ensure reliable ignition for speeds below the transition engine speed 112, however, the pre-selected maximum dwell time 110A must be low enough to not cause excessive spark plug electrode damage or overheating of electronic components during long-term operation. In order to reduce premature spark plug electrode wear, ignition coil dwell times are reduced when engine speed is above the transition engine speed 112 as depicted by portion 110B of the curve 110. Above the transition engine speed 112, the value of the ignition coil dwell time continuously decreases from the value of the pre-selected maximum dwell time (e.g. 5.25 milliseconds) as engine speed increases for a given engine load until the value of the dwell time equals the value of a pre-selected minimum dwell time 114, such as 3.25 milliseconds. Therefore, in accordance with the invention under normal operating conditions, the ignition coil dwell time remains at a pre-selected maximum dwell time during idle, light loads and in the transition region until engine speed increases to a selected transition engine speed, and thereafter decreases as engine speed increases, until reaching the pre-selected minimum dwell time near or above the rated engine speed where the fuel/air mixture in the combustion chamber is homogeneous and near stoichiometric. It may be desirable to adjust ignition coil dwell time with respect to engine load as well as engine speed, although this relationship is not specifically shown in FIG. 8.

Figure 6:
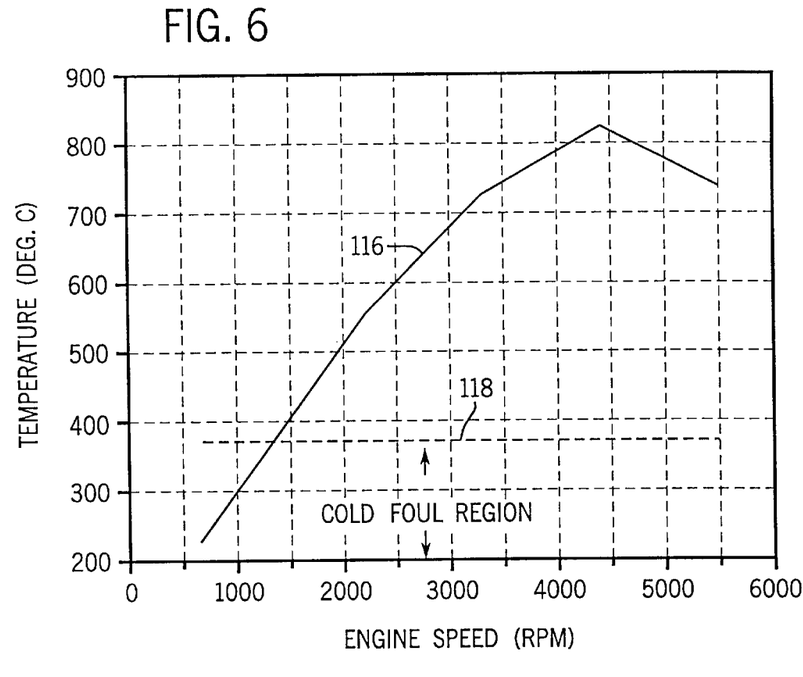
FIG. 6 is a graph illustrating spark plug insulator temperature as a function of engine speed.

Referring now to FIG. 6, curve 116 shows the relationship between spark plug insulation temperature and engine speed for typical boat loads. At idle and light loads, the spark plug insulation temperature is relatively low and therefore spark plugs 22 are more susceptible to fouling. For spark plug insulation temperatures below dashed line 118 (i.e. below 375° C.), spark plug fouling is likely in direct fuel injected engines where fuel is sprayed directly on the spark plug 22 as shown in FIG. 1. Spark plug fouling 22 can create a destructive electrical path from the electrode 26 to engine ground 88, FIG. 1, thereby preventing the occurrence of a spark across the electrodes 26, 27. In order to eliminate spark plug fouling, it is desirable to intermittently clean the spark electrodes of carbon residue.

Figure 9:
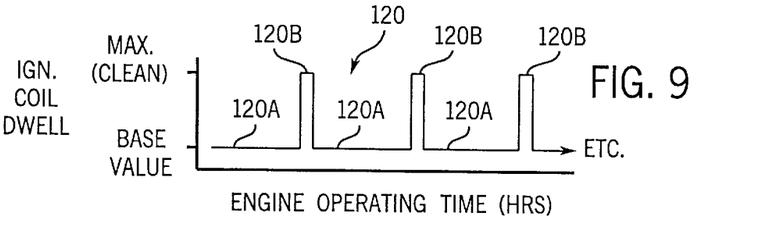
FIG. 9 is a graph illustrating a spark plug electrode self-cleaning strategy in accordance with the invention in which ignition coil dwell times are intermittently exaggerated to oxidize deposits on spark plug electrodes.

Referring to FIG. 9, spark plug electrodes are cleaned of carbon residue during engine operation by intermittently exaggerating ignition coil dwell times for a relatively short amount of time. The exaggerated ignition coil dwell times create additional spark plug energy and duration sufficient to oxidize spark plug carbon residue. FIG. 9 shows a curve 120 illustrating this technique. In FIG. 9, ignition coil dwell time is plotted with respect to engine operating time in hours. Under normal operating conditions 120A, the ignition coils are charged for normal operating dwell times so that the spark energy of the cylinder spark plug is at a normal operating energy level and duration. Intermittently, for instance after 10 to 20 operating hours, ignition coil dwell times are exaggerated 120B above normal operating dwell times. An example of an exaggerated dwell time sufficient to clean spark plug residue is 7 milliseconds. The engine operates using the exaggerated dwell times for a relatively short period of time, for example approximately one minute. Thereafter, the ignition coils are charged for normal operating dwell times until it is determined that spark plug residue should be cleaned again.

Figure 10:
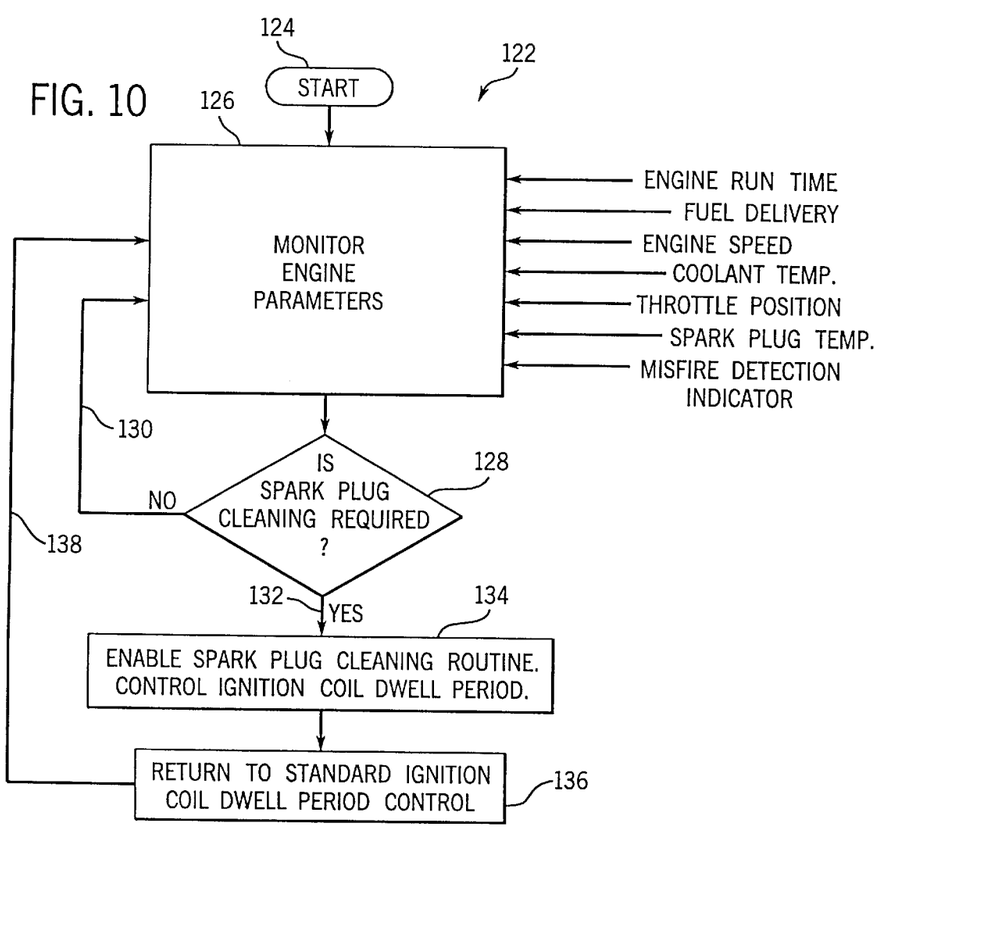
FIG. 10 is a logic diagram showing operation of the intermittent spark plug cleaning routine in accordance with the present invention.

FIG. 10 illustrates a control scheme 122 contained in the electronic control unit 16 that is preferably used to determine when it is appropriate to clean spark plug carbon residue. After system start-up, block 124, the electronic control unit continuously monitors engine parameters, block 126, such as engine run time, amount of fuel delivery, engine speed, engine coolant temperature, engine throttle position, spark plug temperature, and/or cylinder misfire. The electronic control unit 16 determines whether spark plug cleaning is required, block 128, depending on one or more of the monitored engine parameters. For instance, it may be desirable to clean spark plug electrodes whenever a cylinder misfire is detected, and it may also be desirable to clean spark plugs after a pre-selected amount of total engine run time (e.g. 20 engine operating hours), or for a shorter amount of engine run time if the engine has been running cool or at low engine speeds for a significant amount of time. If the electronic control unit 16 determines that spark plug cleaning is not required, the ignition coils continue to be charged at normal operating dwell times, line 130. However, if the electronic control unit determines that spark plug cleaning is desirable, line 132, the spark plug cleaning routine is enabled, block 134, and ignition coil dwell times are exaggerated for a relatively short period of time, for instance one minute, to oxidize carbon residue on or near the spark plug. After spark plug cleaning is completed, ignition coil dwell times return to normal operating dwell times, block 136, and the electronic control unit 16 continues to monitor engine parameters, line 138 and block 126, to determine when the next cleaning cycle is appropriate.

While the drawings and the description thereof have described the invention as being implemented in a direct fuel injected two-stroke engine in which fuel is sprayed directly onto the spark plug electrodes, it should be recognized that the invention is not limited to use in such direct fuel injected two-stroke engines. For instance, engines having cylinder wall or other direct fuel injection systems may benefit from the use of this invention. Also, it is recognized that other alternatives, equivalents and modifications may be apparent to those skilled in the art. The following claims should be interpreted to cover such alternatives, modifications and equivalents.

We claim:

1. In a two-stroke, direct fuel injected internal combustion engine for propelling a watercraft, the engine having a battery powered ignition coil providing electrical energy to a cylinder spark plug, a method of controlling ignition coil dwell time comprising the steps of:

monitoring the engine speed;

using the battery to charge the ignition coil for a pre-selected maximum dwell time when engine speed is at or below a transition engine speed, said transition engine speed being an engine speed at which the watercraft is on plane such that cylinder fluid dynamics are sufficient to prepare cylinder fuel/air charges for enabling reliable combustion even when the ignition coil is charged for a time less than the preselected maximum dwell time; and using the battery to charge the ignition coil for a decreasing dwell time as the engine speed increases from the transition engine speed, the value of the decreasing dwell time continuously decreasing from the preselected maximum dwell time as engine speed increases for a given engine load until the value of the decreasing dwell time equals the value of a pre-selected minimum dwell time.

2. The method of claim 1 wherein the transition engine speed is determined as a function of engine load.

3. The method as recited in claim 1 wherein the transition engine speed is fixed for the particular internal combustion engine.

4. The method as recited in claim 1 wherein the value of the decreasing dwell time is a function of both engine speed and engine load.

5. A method as recited in claim 4 wherein engine load is approximated by sensing engine throttle position with a throttle position sensor.

6. A multi-cylinder, two-stroke internal combustion engine for propelling a watercraft, the engine comprising:

a plurality of engine cylinders each coextensive with a respective combustion chamber;

a fuel injection mechanism for each cylinder that injects fuel directly into the respective cylinder;

a spark plug for each cylinder mounted through a cylinder head for the engine so that an electrode for the spark plug is exposed in the respective combustion chamber;

a dedicated ignition coil and electronic driver for each spark plug;

a battery;

an ignition coil for each spark plug, each ignition coil having a primary winding receiving electrical power from the battery and connected to ground through the respective electronic driver and a secondary winding that provides electrical energy to the respective spark plug when the electronic driver grounds the primary winding;

an engine rpm sensor that monitors an engine revolution rate and generates an engine rpm signal in response thereto;

an engine load sensor that monitors engine load and generates an engine load signal in response thereto; and an electronic control unit that inputs the engine rpm signal and the engine load signal and generates cylinder spark ignition timing control signals to control the operation of the electronic drivers, wherein said electronic control unit optimizes ignition coil dwell time with respect to engine rpm and engine load by controlling the electronic drivers to charge the respective ignition coils in the following manner:

each ignition coil is charged for a pre-selected maximum dwell time when engine speed is below a load transition engine speed, said load transition engine speed being an engine speed at which the watercraft is on plane such that fluid dynamics within the respective cylinders are sufficient to prepare cylinder air/fuel charges for enabling reliable combustion even when the ignition coil is charged for a time less than the preselected maximum dwell time; and each ignition coils is charged for a decreasing dwell time as the engine speed increases from the load transition engine speed, the value of the decreasing dwell time continuously decreasing from the value of the pre-selected maximum dwell time as engine speed increases for a given engine load until the value of the decreasing dwell time equals the value of a preselected minimum dwell time.

7. A multi-cylinder, two-stroke internal combustion engine as recited in claim 6 wherein the engine load sensor is a throttle position sensor that senses the position of the engine throttle and generates a throttle position signal which is indicative of the engine load.

8. A multi-cylinder, two-stroke internal combustion engine as recited in claim 6 wherein the fuel injection mechanism for each cylinder is mounted through the cylinder head and injects fuel into the combustion cylinder through the combustion chamber and directly onto the spark plug electrode for the respective cylinder.

9. A multi-cylinder, two-stroke internal combustion engine as recited in claim 8 wherein the fuel injection mechanism for each cylinder is an air assisted fuel injection mechanism.

10. A multi-cylinder, two-stroke internal combustion engine as recited in claim 6 wherein the electronic controller further comprises means for intermittently increasing ignition coil dwell time above normal operating dwell times for a relatively short period of time to increase spark energy for at least one of the respective cylinder spark plugs to an exaggerated cleaning energy level that is sufficient to oxidize spark plug residue during a relatively short period of time.

* * * * *